United States Patent [19]
Ford et al.

[11] 3,858,317
[45] Jan. 7, 1975

[54] PIPE CUTTING ADAPTER FOR POWER DRILLS

[76] Inventors: Clancy B. Ford, 6651 18th Ave., Sacramento, Calif. 95820; Charles E. Ford, 16901 Schoolcraft St., Van Nuys, Calif. 91406

[22] Filed: Dec. 13, 1973

[21] Appl. No.: 424,380

[52] U.S. Cl. .................................... 30/92, 30/372
[51] Int. Cl. ............................................ B23d 21/00
[58] Field of Search ............ 30/166, 372, 374, 378, 30/373, 375, 388, 92, 96, 97

[56] References Cited
UNITED STATES PATENTS

| 766,725 | 8/1904 | O'Neil | 30/372 X |
| 2,329,729 | 9/1943 | Saucke | 30/372 X |
| 2,973,576 | 3/1961 | Hentke | 30/92 |
| 3,449,992 | 6/1969 | Hanaway | 30/92 X |
| 3,805,383 | 4/1974 | McNally | 30/92 |

*Primary Examiner*—Al Lawrence Smith
*Assistant Examiner*—J. C. Peters
*Attorney, Agent, or Firm*—William I. Beach

[57] ABSTRACT

A small motorless tool is disclosed for cutting pipes which have been permanently installed in crowded environments. The tool has a rotatable circular saw mounted for translational movement toward and away from a pipe to which the tool is initially clamped. A driveshaft for the saw protrudes from one end of the tool and is adapted for operative driving engagement by a drill chuck on a portable electric drill.

6 Claims, 5 Drawing Figures

Patented Jan. 7, 1975
3,858,317
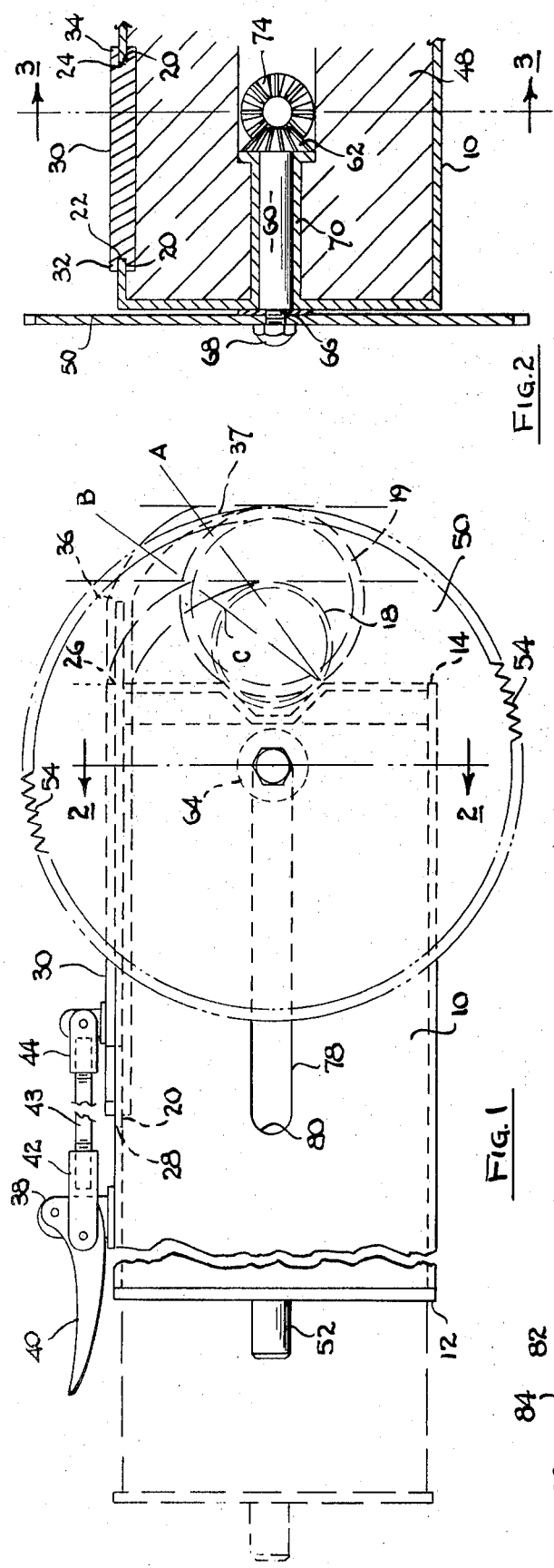
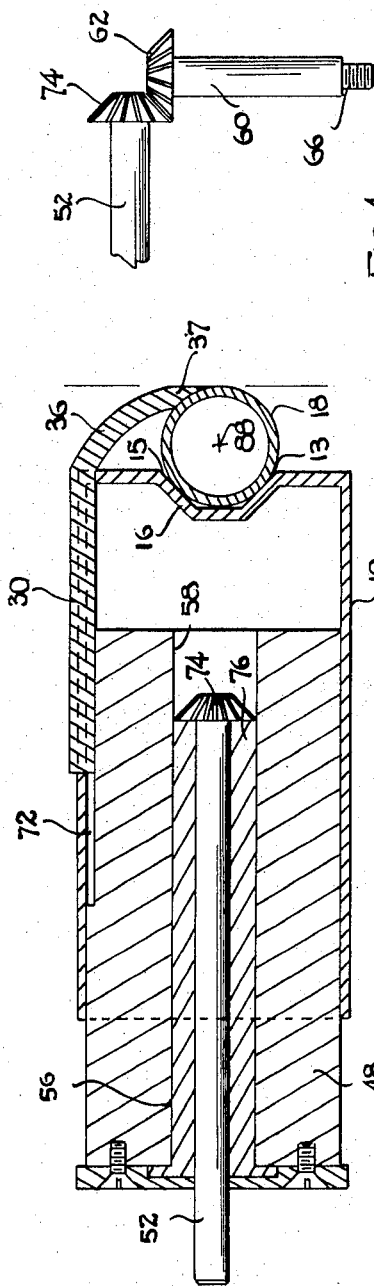
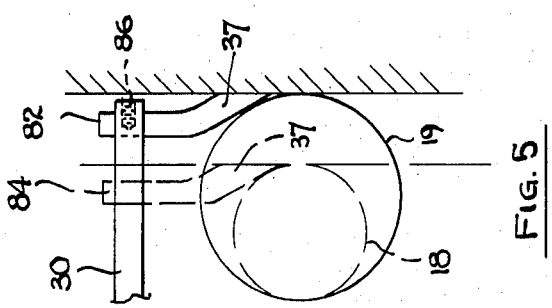

PIPE CUTTING ADAPTER FOR POWER DRILLS

BACKGROUND OF THE INVENTION

1. Field of the Invention

The present invention relates to pipe and bar cutting tools and more particularly for an improved power-driven tool for cutting pipes and the like in crowded installations.

2. Description of the Prior Art

Metal pipes such as used in household plumbing systems are typically hard to cut, especially after their complete installation within the floors and partitions of a house or other structure. Due to cramped conditions where a single or several pipes are installed intimately in contact with a wall stud or wood and plaster walls, working space for cutting such pipes is severely limited. Such cutting tools must be small and compact in order to operate in the desired location where cutting is required to sever completely through a pipe. Portable cutting tools available for this purpose comprise hand or power-driven reciprocating hacksaws, cutters which revolve around the exterior surface of the pipe and rotatable circular blade cutters adapted to clamp on to a pipe. Hacksaw blades must be maintained in constant tension and must be reciprocated through a range of movement requiring considerable space on either side of the cutting area since hacksaw frames used to impose such tension are considerably larger than the blade mounted therein. The revolving cutters which move around a pipe are limited to pipes installed some distance from wall surfaces, studs and the like since the handle of this type of cutter must swing in a large circle around the pipe. The rotatable blade cutter utilizes clamp means to secure the cutter to the pipe in stationary position while cutting through the pipe. In that connection, it has been found that rotatable blade cutters shown in the prior art utilizes clamp devices having arm members extending beyond the side of the pipe opposite the side immediately adjacent to the cutter. Accordingly, if the pipe is attached to a surface such as a stud, wall or the like, it is impossible for such a cutter to clamp on and hold to a pipe without damaging or removing a portion of the wall to which the pipe is affixed. To better illustrate this problem, the rotatable circular blade device shown in U.S. Pat. No. 3,449,992 to C. D. Hanaway discloses a pipe held between two upright jaw members mounted on a manually-held power-driven pipe cutter. It is readily seen that such a tool is not suitable for cutting pipes running closely parallel to one another or to a pipe intimately attached to a barrier-like surface such as a wall.

Therefore, it is the object of the present invention to provide a rotatable circular saw blade cutter that will solve the aforementioned problem yet which can be readily manufactured with simple but unique clamp means for holding a pipe in stationary relationship therewith while cutting therethrough without the necessity of damaging or removing a portion of a walllike surface to which the pipe is affixed.

SUMMARY OF THE INVENTION

In carrying out the principles of the present invention in accordance with a preferred embodiment thereof, a small, compact cutting tool has no power of its own but is adapted for connection with a small electric drill of the type used by most householders to drill holes. The inventive tool has an exterior housing adapted to be clamped to a pipe by means of an adjustable clamping arm. Laterally slidable within the housing is a slide block having two connecting passages and therein oriented substantially normal to each other. The longer passage contains a rotatable drive-shaft, one end of which is adapted to be gripped within a drill chuck and driven rotationally thereby. The shorter passage contains a transmission shaft, to one end of which a circular saw blade is attached. Bevel gears integrally formed or otherwise connected to the drive-shaft and transmission shaft respectively, are operatively interengaged so that rotation of the drive-shaft causes rotation of the transmission shaft and the saw blade mounted thereon.

In operation, the slide block is first withdrawn from the housing and thereafter moved toward the clamped pipe while the drive-shaft and tranmission shaft are simultaneously rotated by an externally connected portable drill to rotatably cut completely through the pipe.

BRIEF DESCRIPTION OF DRAWING

FIG. 1 shows a side elevational view of the inventive tool operatively related to a workpiece for cutting the same, FIG. 2 shows a cross-sectional view taken along line 2—2 of the structure shown in FIG. 1, FIG. 3 shows a cross-sectional veiw of the structure shown in FIGS. 1 and 2 taken along line 3—3 in FIG. 2, FIG. 4 shows an isolated plan view of two mechanical elements from the structure shown in FIGS. 1 through 3, and FIG. 5 shows an isolated elevational view of another arrangement of the clamping arm shown in FIGS. 1 through 3.

DESCRIPTION OF THE PREFERRED EMBODIMENT

Referring to FIG. 1, it can be seen that the tool disclosed comprises an outer housing 10 of rigid elongate form having opposite ends 12 and 14. Housing 10 is of generally square cross-sectional shape as shown in FIG. 2, but could alternately be of round or cylindrical shape. In either case, housing 10 may be made from sheet metal or the like so as to be strong, smooth-surfaced and completely hollow. End 14 is closed and end 12 is open. End 14 has an indented contact area or jaw 16 formed therein adapted to make firm outer surface contact with pipe 18. In one side of housing 10 is a longitudinal slot extending from about the middle thereof to end 14 of housing 10. The slot has spaced apart edges 22 and 24 and is open at end 26 and closed at end 28. Slidably mounted in the slot is an elongate clamp arm 30 having spaced apart parallel grooves 32 and 34 in opposite sides thereof adapted to slide on edges 22 and 24 respectively. Arm 30 has a claw-like front tip portion 36 extending forwardly and downwardly to distal end 37 and adapted to apply clamping force on the exterior surface of pipe 18 to hold it in firm and continuous stationary relationship with jaw 16. Pivotally mounted on housing 10 adjacent to end 28 of the slot is a latching device 38 having a handle 40, link 42 rotatably connected to handle 40, rod 43 threadly connected to link 42 and threadly connected to a fork attachment 44 also pivotally connected to arm 30. When arm 30 applies clamping force on pipe 18 the tip 36 and distal end 37 is formed so as to approach the surface of said pipe from one side and contact it on the opposite side yet not extend beyond said opposite side when said side is adjacent to and attached to a barrier such as a wall.

An elongate and generally rectangular cross-sectional shaped slide block 48 is contained within housing 10 and adapted for reciprocal sliding movement relative thereto. Circular saw blade 50, which is operatively connected to slide block 48 in a manner described more fully below, makes the same reciprocating movement as block 48, while housing 10 remains stationary after being clamped to stationary pipe 18. Saw blade 50 is rotatably driven through appropriate intermediate mechanical connection with drive-shaft 52, one end of which may be seen in FIG. 1 to protrude from one end of slide block 48 which extends from end 12 of housing 10. When housing 10 is clamped to pipe 18, blade 50 is rotated by application of driving force to shaft 52 using an electric drill. Manual force applied to the drill is used to cause translational movement of such drill together with slide block 48 toward the right as seen in FIG. 1, resulting in teeth 54 on blade 50 progressively cutting through pipe 18.

With reference to FIG. 2, it is seen that slide block 48 has a longitudinal passage 56 therein adapted to contain drive-shaft 52, and a lateral passage 58 adapted to contain an intermediate rotational force connection in the form of shaft 60. Shaft 60 has a bevel gear 62 formed integrally or otherwise secured to shaft 60 at one end thereof, and means for securing saw blade 50 at the other end thereof such as suggested by spacer washer 64, threads 66 and retaining nut 68. To minimize friction and wear, shaft 60 is preferably journalled for rotation within a suitable bushing 70 adapted to fit closely within the lateral passage formed in slide block 48. Further, a longitudinal portion 72 of slide block 48 adjacent to clamp arm 30 is removed as seen in FIG. 2 to allow free movement of arm 30 and block 48 relative to each other.

Bevel gear 62 operatively engages another bevel gear 74 integrally formed or otherwise affixed to shaft 52 as shown in FIG. 3. The foregoing relationship is also shown by the isolated view in FIG. 4. Drive-shaft 52 is preferably contained within substantially cylindrical bushing 76 made of low friction coefficient material or else surface treated to minimize friction between bushing 76 and drive-shaft 52. Bushing 76 is preferably retained securely within slide block 48 by any suitable means such as snug or force fitting the same within longitudinal passage 56.

It will be understood from the disclosure set forth above and shown in the drawing that drive-shaft 52 protrudes externally from slide block 48, and that slide block 48 extends outwardly from housing 10 in such a manner as to permit operative connection of drive-shaft 52 with a drill chuck capable of rotating drive-shaft 52 such as associated with operation of portable electric drills (not shown). It will further be understood that lateral force applied to drive-shaft 52 through the stated drill and drill chuck will cause corresponding sliding movement of slide block 48 and elements mounted therein, including shaft 60 and saw blade 50.

Accordingly, in operating the present invention the outer end of shaft 52 is inserted in the chuck of the aforementioned drill and moved rearwardly relative to housing 10. As slide block 48 likewise moves rearwardly carrying drive-shaft 52, shaft 60 and saw blade 50 the retaining nut 68, connecting blade 50 to shaft 60, moves rearwardly along slot 78 to stop 80, where movement of block 48 stops and blade 50 is completely retracted behind front end 14 of housing 10. Whereupon, in preparation of clamping housing 10 to pipe 18, handle 40 of latch 38 is rotated clockwise to provide slack in link 42, rod 43 and fork 44 thereby permitting clamping arm 30 to move freely in reciprocating longitudinal direction relative to housing 10. Unlocked from housing 10 arm 30, slidably mounted on track edges 22 and 24 by grooves 32 and 34, is advanced to extend the tip portion 36 forwardly of front end 14 of housing 10. Then slightly raising the drill and housing 10 so that the distal end 37 of tip 36 is above and adjacent to the side of pipe 18 opposite the side facing jaw 16, the tip is lowered to bring distal end 37 in clamping engagement with the longitudinal surface of pipe 18. To complete the aforementioned clamping engagement, housing 10 is pushed toward pipe 18 and arm 30 is caused to slide rearwardly with respect to the front end 14 of housing 10 and when pipe 18 is firmly secured to jaw 16 handle 40 is rotated counterclockwise to apply pipe holding tension on arm 30. Until released by unlocking arm 30 as previously described, more than one-half of the circumferential surface area of said pipe is held tightly in contact with the distal end 37 of arm 30 and lower lip 13 and upper lip 15 of jaw 16 by an amount equal to the circumferential segment laying between a line A drawn from distal end 37 to lower lip 13 and a line B drawn from lip 13 through the center of pipe 18 intersecting the circumferential surface at point C as shown in FIG. 1.

Referring again to FIG. 1, it can be seen that the distance between latch 38 mounted on housing 10 and fork 44 mounted on arm 30 can be extended by turning rod 43 which has R.H. and L.H. threaded ends similar to a conventional turn-buckle employed to take up slack in a cable, for example. Accordingly, by increasing the said distance arm 30 can be extended so as to embrace a larger diameter pipe 19 as shown in FIGS. 1 and 5. Further, FIG. 5 shows an isolated elevational view of two removable tips 82 and 84 adapted to clamp and apply holding pressure on a larger pipe 19 and smaller pipe 18 respectively. Tips 82 and 84 are fastened to arm 30 by fastening means such as set screw 86.

It is additionally significant in the inventive concept thus disclosed that the substantial contact between pipe 18 and jaw 16 of housing 10 under the strong vice-like pressure applied by arm 30 results in accurate orientation of the housing whereby the direction of movement of slide block 48, blade 50 and interconnecting elements therebetween is substantially perpendicular to the longitudinal axis of the pipe denoted by numeral 88 in FIG. 3, for example. The foregoing relationship ultimately results in a clean squarely-cut end on pipe 18 in a plane substantially normal to axis 88, as required for engagement of threading die (not shown) with the cut end of the pipe.

The foregoing detailed description is to be clearly understood as given by way of illustration and example only, the spirit and scope of the present invention being limited solely by the appended claims.

We claim:

1. A tool for cutting a stationary cylindrical pipe comprising:
    a rigid elongate thin wall metal housing substantially square in cross-sectional shape having a front end and a rear end, the front end being formed in a V-shaped transversely disposed jaw having spaced apart upper and lower lips, the housing further including an elongate U-shaped slot extending from intermediate the front and rear end of said housing to exit at said front clamp means slidably mounted on the track rails for releasably clamping said housing to the pipe in stationary relationship therewith, a circular saw blade externally supported by said housing and translationally movable relative thereto, drive means connected to the saw blade for rotating said blade, the drive means including a drive-shaft extending outwardly from said housing for connection with a drill chuck, and guide means contained within said housing comprising an elongate slide block sized to fit closely there within in substantially uniform surface area contact therewith and slidably movable thereto for guiding the translational movement of said saw blade in a plane substantially perpendicular to the center longitudinal axis of said cylindrical pipe when said housing is clamped to said pipe by said clamp means.

2. A tool as recited in claim 1, wherein:

said drive means further includes an elongate shaft supported for rotation within said guide means, retaining means on the elongate shaft for affixing said saw blade to one end thereof, a first bevel gear affixed to the other end of said elongate shaft opposite from one end thereof, and a second bevel gear affixed to said drive-shaft and operatively engaging the first bevel gear in driving relationship therewith.

3. A tool as recited in claim 2, wherein:

said elongate shaft and said drive-shaft are both supported within passages within the slide block and situated substantially normal to each other.

4. A tool as recited in claim 3, wherein:

said clamp means comprises an elongate arm with parallel grooves in opposite sides arranged to slide on the edges of the U-shaped slot, the arm further includes a claw-like tip portion extending forwardly of said housing front end, the tip portion further having a distal end adapted to apply holding pressure on said pipe adjacent to the surface area thereof in contact with a longitudinal plane tangent to said pipe on the side opposite the side facing the jaw on said housing, and latch means mounted on said housing having extensible connection with said arm so as to permit said arm to releasably clamp said pipe and secure same to said jaw.

5. A tool as recited in claim 4, wherein:

said arm is substantially rectangular in cross-sectional area.

6. A tool as recited in claim 5, wherein:

said slide block further includes a groove in the surface thereof disposed parallel and adjacent to said slot adapted to clear the bottom portion of said arm in movement relative to said arm.

* * * * *